Sept. 20, 1932.  C. W. SHERMAN  1,877,998
SHOCK ABSORBER
Filed March 10, 1927   2 Sheets-Sheet 1
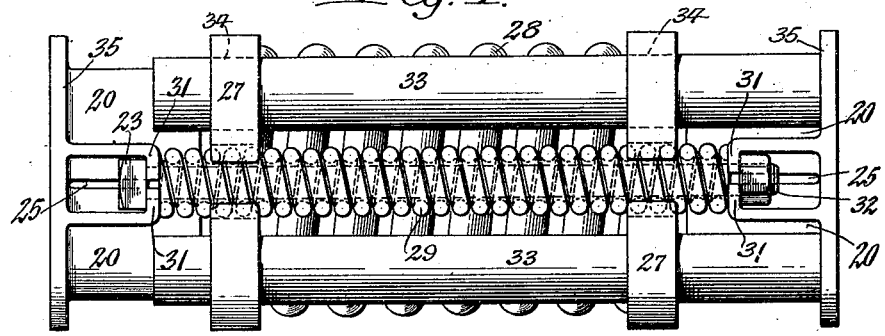
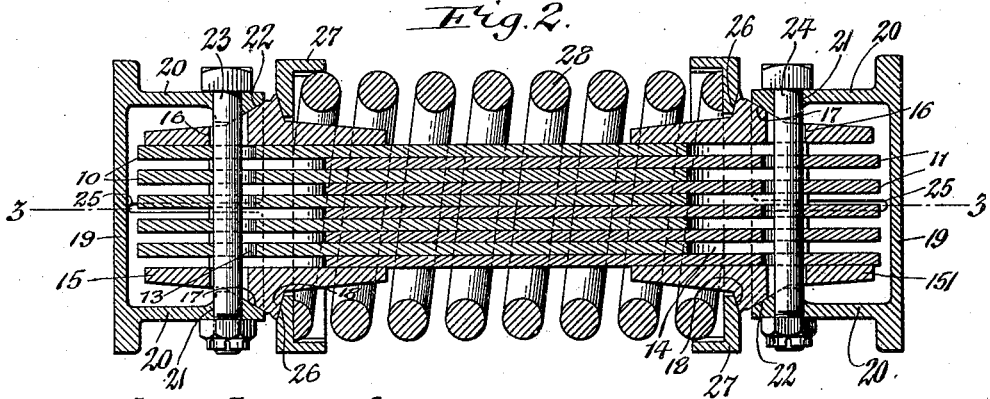
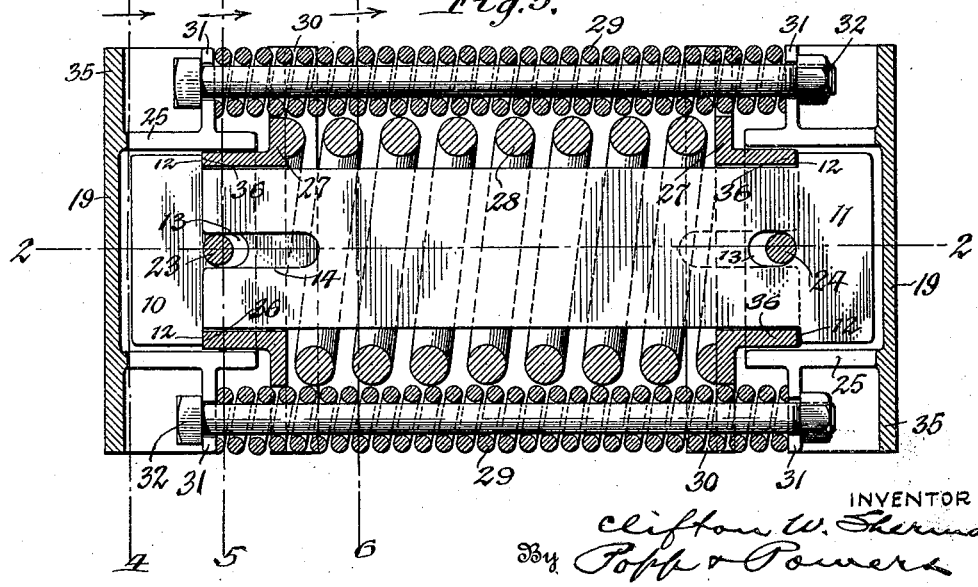
INVENTOR
Clifton W. Sherman
By Popp & Powers
Attorneys Sept. 20, 1932.  C. W. SHERMAN  1,877,998
SHOCK ABSORBER
Filed March 10, 1927  2 Sheets-Sheet 2
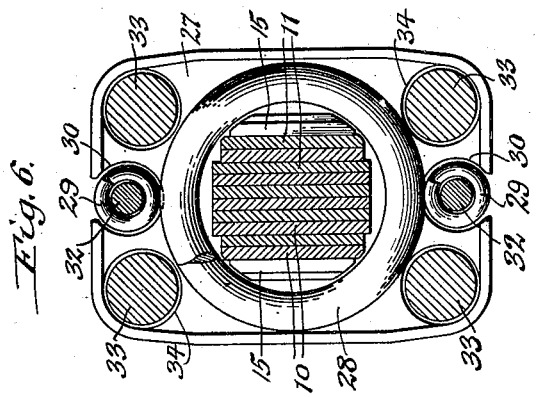
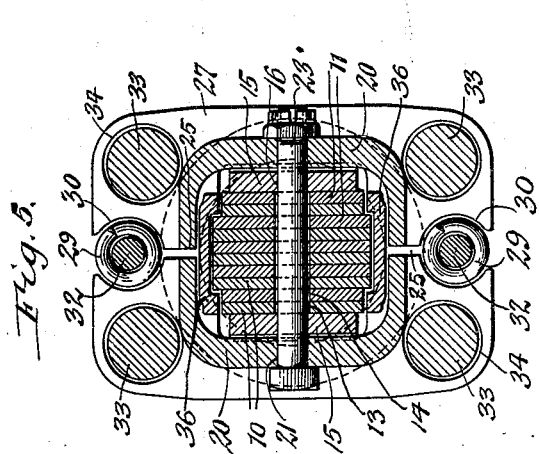
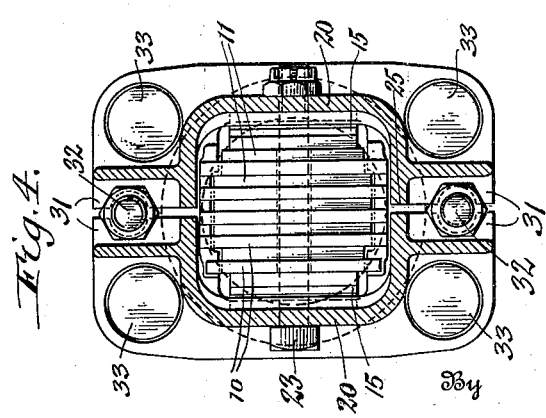
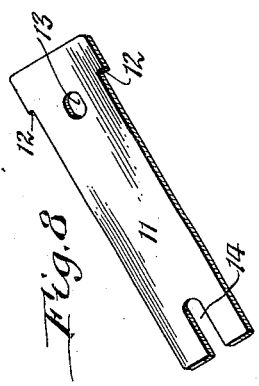
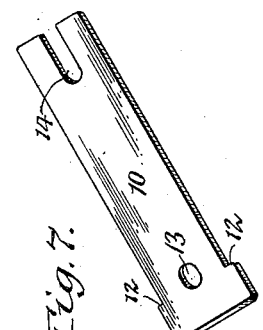

Patented Sept. 20, 1932

1,877,998

UNITED STATES PATENT OFFICE

CLIFTON W. SHERMAN, OF HAMILTON, ONTARIO, CANADA

SHOCK ABSORBER

Application filed March 10, 1927. Serial No. 174,181.

This invention relates to a shock absorber of that type which includes, among other elements, a plurality of sets of intercalated friction plates which are adapted to be pressed transversely together and to slide lengthwise relatively to one another for the purpose of the absorbing shock of a moving load such as that to which a railway car is subjected.

It is the object of this invention to provide means for taking up the wear on the friction plates and the parts associated therewith and to improve and simplify the construction so as to reduce the cost of manufacture and secure greater efficiency in operation.

In the accompanying drawings:

Figure 1 is a top plan view of a shock absorber embodying my improvements. Figure 2 is a longitudinal section of the same taken on line 2—2, Fig. 3. Figure 3 is a longitudinal section taken on line 3—3, Fig. 2. Figures 4, 5 and 6 are vertical transverse sections taken on the correspondingly numbered lines in Fig. 2. Figures 7 and 8 are perspective views of a pair of friction plates adapted to oppose each other in my improved shock absorber.

Similar characters of reference indicate like parts in the several views of the drawings.

The numerals 10, 11 represent two sets of intercalated friction plates of metal which are adapted to be moved lengthwise relatively to one another and also adapted to be pressed together transversely for increasing the friction contact between the same and resist the relative movement of the same. At its outer end each of these plates is increased in width so as to form two inwardly facing shoulders 12 at opposite edges thereof and along the longitudinal central line of each of these plates the same is provided adjacent to its outer end with a comparatively short slot 13 and at its inner end with a comparatively long slot 14, as shown in Figs. 2, 3, 7 and 8.

On opposite sides of the sets of plates and at opposite ends thereof the same are engaged by pairs of wedge shoes 15, 151, each of which is provided with a longitudinal slot 16 and also provided on its outer side with a rib forming an outwardly facing incline 17 and an inwardly facing incline 18. Arranged at the opposite ends of the sets of plates are two follower means or followers which have the form of housings, each of these followers being preferably, though not necessarily, contained in one piece and consisting of a transverse outer head 19 adapted at times to bear against the outer ends of one set of plates and at other times to be spaced therefrom, and two wedge pressure creating members 20 projecting inwardly from opposite ends of the head 19 and each provided with an opening 21 and an inwardly facing incline 22 which engages the outwardly facing incline 17 of the adjacent shoe.

The numerals 23, 24 represent coupling and adjusting bolts each of which passes transversely through the openings of one pair of shoes and through the outer slots of one set of plates and the inner slots of the other pair of plates and bears with its head and nut against the outer longitudinal sides of the respective pair of wedge members 20. The two wedge members of each follower are separated from each other by intervening slits 25 so as to permit these wedge members to be drawn toward each other by the respective bolt for taking up wear in the shock absorber, and during such adjustment the head of the respective follower is capable of bending on a line with said slits.

The inner inclines of each pair of shoes are engaged by outer inclines 26 on a spring seat 27 which surrounds the adjacent parts of the friction plates and wedge shoes. Each of these spring seats is provided centrally with restoring flanges 36 which project outwardly between the friction plates and wedge members of the respective follower and are adapted to engage the inwardly facing shoulders 12 of the adjacent set of friction plates.

The numeral 28 represents the main thrust or resistance spring which is preferably of helical form and surrounds the friction plates and shoes and bears at its opposite ends against the inner sides of the spring seats. Arranged along opposite sides of the main thrust spring are two releasing springs 29, 29, each of which passes through openings 30 in the spring seats and bears at its opposite ends against inwardly facing lugs 31 on the followers. The extent of opening of the shock absorber is limited by two stop or tie bolts 32 each of which extends lengthwise through one of the releasing springs and bears with its head and nut against the outer sides of the lugs 31, as shown in Figs. 1, 3 and 4. When the shock absorber has reached the predetermined limit of its closing movement the same is rendered solid by means of a plurality of over-solid rods 33 arranged lengthwise along the main and releasing springs and sliding loosely in openings 34 in the spring seats 27 and adapted to bear at opposite ends against the inner sides of laterally projecting flanges 35 on the followers, when the absorber is fully closed.

When a buffing or pulling movement is applied to either of the followers sufficient to overcome the initial compression of the release and main springs and the frictional resistance between the sets of friction plates due to the wedge action on the shoes which are pressed inwardly against the plates, then one of the followers moves inwardly and causes its wedge members to press the companion shoes together so that the friction plates engage each other with increased frictional resistance against sliding relatively to one another. After the plates have been thus pressed together more tightly the head of the moving follower engages the outer ends of the respective set of plates and moves the latter inwardly together with the other set of plates until the last mentioned set engage their outer ends with the head of the other follower which at this time is stationary. It is to be understood that the other pair of shoes during the movement just mentioned have a wedging engagement at this time with the wedging members of the relatively stationary follower and thereby exert a transverse inward pressure against the outer sides of the friction plates adjacent to the stationary follower. As the moving follower now continues its inward movement the same is opposed by the increased frictional resistance between the moving set of friction plates and the stationary set of such plates, whereby the shock is absorbed, this frictional and spring resistance increasing up to the limit of the closing movement of the absorber.

When the load on the shock absorber is relieved the first effect is that the releasing springs push the moving follower outwardly and disengage its head from the outer ends of the respective set of friction plates and at the same time its wedge members move outwardly away from the companion shoes so that the latter relieve their inward pressure against the friction plates. When this occurs the main spring acts on the spring seat next to the moving follower and this spring seat acts on the shoulders of the respective set of plates and moves the latter outwardly. During the first part of the outward movement of the plates next to the moving follower the shoes and plates next to the stationary follower are also moved in the same direction, whereby the outer ends of the last mentioned plates are moved away from the stationary follower and the inward pressure of the respective shoes is relieved, thereby enabling the two sets of friction plates to be henceforth pulled apart with less frictional resistance up to the point where the absorber is fully opened.

If for any reason the friction plates should tend to stick together upon removing the load the adjusting bolt of the moving follower will engage the outer ends of the outer slots 13 in the respective plates and thereby add the pulling effect of the releasing spring to that of the main spring for releasing the absorber during which time the other set of plates is held back by engagement of the outer ends of the slots 13 in the relatively stationary plates with the adjusting bolt of the relatively stationary follower.

Whenever sufficient wear has taken place on the cooperating surfaces of the several friction plates, the wedge shoes and the wedge members of the followers to warrent taking it up, this is accomplished by tightening the take-up and coupling bolts 23, 24, whereby the wedge members of each follower are drawn inwardly or toward each other and any slack due to wear on the friction surfaces of the wedge members, shoes and plates is taken up and a prompt increased gripping effect of the shoes on the plates is obtained during the initial inward movement of either follower. In the absence of such wear taking up capacity the moving follower would have to effect an initial closing movement of gradually increasing extent as the wear progressed and thus interfere with the prompt and maximum shock absorbing action of the gear.

It will be noted that in this construction the housing shaped follower is not provided with any shoulders which engage with the release shoulders of the plates, this function being now performed by the coupling and take-up bolts which connect the follower housing with the plates. By this means it is possible to use follower housings in which the outer ends are closed by heads and still permit all the plates to be assembled with the springs, springs seats and shoes, and then place the housing shaped followers in position last, which method is much easier and effects a corresponding saving in manufacture and maintenance.

I claim as my invention:

1. A shock absorber comprising a plurality of sets of intercalated friction plates which are movable lengthwise relatively to one another, shoes adapted to be pressed transversely against said plates and having inclined faces, follower means adapted to engage said plates for moving them lengthwise and having wedge portions engaging with the inclines of said shoes, a spring resistance, and take-up bolts connecting the wedge portions of each of the follower means and adapted to tighten the same for taking up wear on the wedge portions, shoes and plates.

2. A shock absorber comprising a plurality of sets of intercalated friction plates which are movable lengthwise relatively to one another, wedge shoes engaging the said sets of plates, said plates and shoes having longitudinal slots, follower means having heads adapted to engage the outer ends of said plates and wedge members engaging said wedge shoes, bolts connecting the wedge members of the follower means and adapted to move the same toward each other upon tightening the bolts and passing through the slots of the shoes and plates, and a spring resistance.

3. A shock absorber comprising a plurality of sets of intercalated friction plates which are movable lengthwise relatively to one another, wedge shoes engaging the said sets of plates, said plates and shoes having longitudinal slots, follower means having heads adapted to engage the outer ends of said plates and wedge members engaging said wedge shoes, bolts connecting the wedge members of the follower means and adapted to move the same toward each other upon tightening the bolts and passing through the slots of the shoes and plates, and a spring resistance, the wedge members of each follower means being separated from each other by slits.

4. A shock absorber comprising a plurality of sets of intercalated friction plates which are movable lengthwise relatively to one another, wedge shoes engaging the said sets of plates, said plates and shoes having longitudinal slots, follower means having heads adapted to engage the outer ends of said plates and wedge members engaging said wedge shoes, bolts connecting the wedge members of the follower means and passing through the slots of the shoes and plates, and a spring resistance, the head and wedge members of each follower means being formed integrally and the wedge members thereof being separated from each other by slits and the head thereof being bendable on a line with said slits.

5. A shock absorber comprising a plurality of sets of intercalated friction plates which are slidable lengthwise to one another; follower means adapted to engage the outer ends of said sets of plates, respectively, for sliding one set lengthwise relative to the other set; spring means for resisting the sliding movement of one of said sets of plates relatively to the other under the action of the respective follower; and pressure means for pressing transversely together the sets of plates at opposite ends thereof upon moving one follower and the corresponding set of plates lengthwise relatively to the other follower and set of plates and releasing said transverse pressure upon moving one follower and the corresponding set of plates lengthwise from the other follower and set of plates, said pressure means including cooperating wedge members arranged at opposite ends of the sets of intercalated friction plates and connected with the respective followers and bearing against the flat sides of the sets of intercalated friction plates at opposite ends thereof, and manually operable adjusting means arranged at opposite ends of the sets of friction plates and each adapted upon being tightened to shift the wedge members at the respective end of the sets of friction plates relatively to one another and take up the wear between the opposing flat surfaces of the friction plates.

In testimony whereof I hereby affix my signature.

CLIFTON W. SHERMAN.